United States Patent
Lavine et al.

(10) Patent No.: US 12,411,306 B2
(45) Date of Patent: Sep. 9, 2025

(54) ADJUSTABLE OPTICAL MOUNT

(71) Applicant: Raytheon Company, Waltham, MA (US)

(72) Inventors: Jason R. Lavine, McKinney, TX (US); Steven Palomino, McKinney, TX (US)

(73) Assignee: Raytheon Company, Arlington, VA (US)

( * ) Notice: Subject to any disclaimer, the term of this patent is extended or adjusted under 35 U.S.C. 154(b) by 960 days.

(21) Appl. No.: 17/535,468

(22) Filed: Nov. 24, 2021

(65) Prior Publication Data

US 2022/0163762 A1 May 26, 2022

Related U.S. Application Data

(60) Provisional application No. 63/117,900, filed on Nov. 24, 2020.

(51) Int. Cl.
*G02B 26/08* (2006.01)
*G02B 7/182* (2021.01)
*G02B 7/198* (2021.01)

(52) U.S. Cl.
CPC ........... *G02B 7/1821* (2013.01); *G02B 7/198* (2013.01)

(58) Field of Classification Search
CPC .... G02B 7/1821; G02B 7/198; G02B 26/101; G02B 26/08
See application file for complete search history.

(56) References Cited

U.S. PATENT DOCUMENTS

| | | |
|---|---|---|
| 3,204,471 A | 9/1965 | Rempel |
| 3,402,613 A | 9/1968 | Neusel et al. |
| 5,523,883 A | 6/1996 | Myers et al. |
| 8,570,675 B1 | 10/2013 | Marr et al. |
| 9,323,025 B2 | 4/2016 | Heidemann et al. |
| 2012/0170095 A1* | 7/2012 | Dolleris ............... G02B 7/1821 359/212.2 |

FOREIGN PATENT DOCUMENTS

JP H10-186215 A 7/1998

OTHER PUBLICATIONS

Collins, How can lead screw backlash be reduced?, https://www.linearmotiontips.com/how-can-lead-screw-backlash-be-reduced/#:~:text=The%20most%20basic%20method%20for,flanks%20of%20the%20screw%20thread., Nov. 14, 2019, 8 pages, WTWH Media LLC, Cleveland, Ohio.
International Search Report for International Application No. PCT/US2021/060859 dated Mar. 22, 2022, 17 pages.

* cited by examiner

*Primary Examiner* — Euncha P Cherry

(57) ABSTRACT

An adjustable optical mount is disclosed. The adjustable optical mount can include a base. The adjustable optical mount can also include a rotatable frame rotatably coupled to the base about an axis. The rotatable frame can be operable to support an optical element. Additionally, the adjustable optical mount can include a ramp operably coupled to the rotatable frame such that translational movement of the ramp relative to the rotatable frame causes rotation of the rotatable frame about the axis to facilitate adjustment of the optical element in a rotational degree of freedom.

26 Claims, 5 Drawing Sheets

ADJUSTABLE OPTICAL MOUNT

RELATED APPLICATIONS

This application claims the benefit of U.S. Provisional Patent Application No. 63/117,900, filed Nov. 24, 2020, and entitled, "Adjustable Optical Mount," which is incorporated by reference in its entirety herein.

BACKGROUND

Optical elements, such as beam splitters, mirrors, prisms, lenses, etc., are commonly used in a variety of applications. Typically, such optical elements are required to be in a precise position or alignment in order to function properly. However, the position of optical elements may slowly shift over time due to factors introduced during installation, transit, handling (e.g., drops), use (e.g., thermal effects), gimbal errors, etc. Thus, a variety of factors can lead to an optical element being misaligned both prior to and during actual field use.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
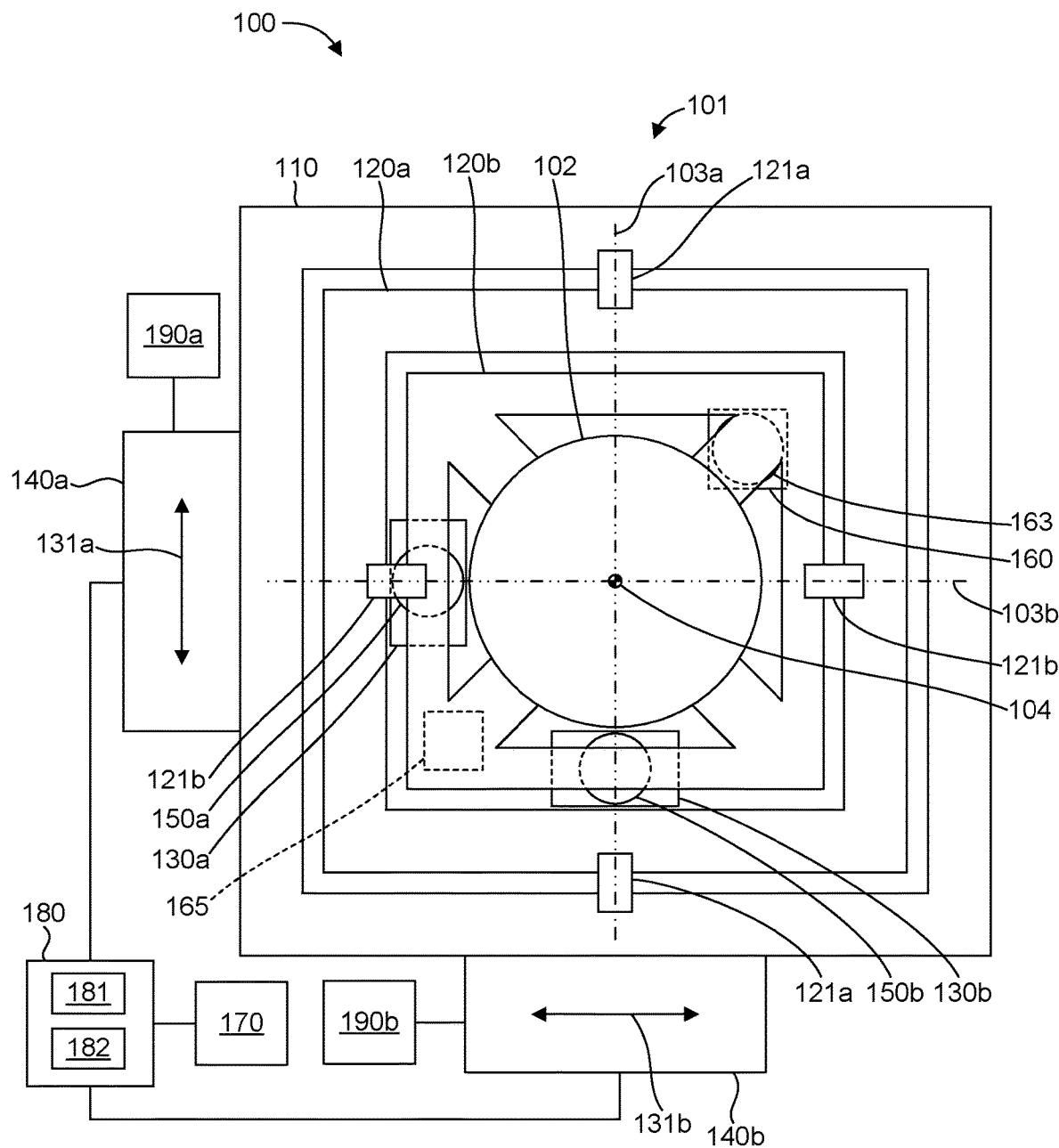
FIG. 1 is a schematic top view of an adjustable optical mount system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Due to due to cleanliness or other concerns, directly accessing a misaligned optical element mounting structure may not be feasible in the field, even though it may be beneficial to correct misalignments introduced during installation, transit, handling (e.g., drops), use (e.g., thermal effects), gimbal errors, etc. Some optical systems utilize fast-steering mirrors (FSMs) or piezoelectric systems to provide high-precision adjustments of optical elements. FSMs and piezoelectric systems, however, typically require complex electronics and a constant supply of power to maintain position. Therefore, such adjustment systems are typically expensive and are not failsafe.

Accordingly, an adjustable optical mount is disclosed that, in operation, enables optical element adjustment without requiring any disassembly of the optical system. In one aspect, the adjustable optical mount can provide a low cost optical element adjustment solution that is also failsafe (e.g., does not require constant power to maintain position). The adjustable optical mount can include a base. The adjustable optical mount can also include a rotatable frame rotatably coupled to the base about an axis. The rotatable frame can be operable to support an optical element. Additionally, the adjustable optical mount can include a ramp operably coupled to the rotatable frame, such that translational movement of the ramp relative to the rotatable frame causes rotation of the rotatable frame about the axis to facilitate adjustment of the optical element in a rotational degree of freedom.

An adjustable optical mount system can comprise an optical element and an adjustable optical mount supporting the optical element. The adjustable optical mount can include a base. The adjustable optical mount can also include a rotatable frame rotatably coupled to the base about an axis. The rotatable frame can be in support of the optical element. Additionally, the adjustable optical mount can include a ramp operably coupled to the rotatable frame, such that translational movement of the ramp relative to the rotatable frame causes rotation of the rotatable frame about the axis to facilitate adjustment of the optical element in a rotational degree of freedom.

To further describe the present technology, examples are now provided with reference to the figures. With reference to FIG. 1, one embodiment of an adjustable optical mount system 100 is illustrated. The system 100 can comprise an adjustable optical mount 101 and an optical element 102 supported by the adjustable optical mount 101 for mounting the optical element 102 to a support structure (e.g., a frame or a housing). The optical element 102 can be any suitable type of optical element or combination of optical elements, such as at least one of a beam splitter, a mirror, a prism, or a lens. In one aspect, the optical element 102 can be or include a reflective optical element (e.g., a mirror) and/or a transmissive optical element (e.g., a lens). The optical element 102 may be made of glass, metal, or another suitable material or substrate. The optical element 102 can have any suitable shape, such as a circular shape, an oval shape, a triangular shape, a rectangular shape, etc. In one aspect, the adjustable optical mount 101 can support aperture-sharing (e.g., a beam passes through the optical element 102 and a beam reflects off the optical element 102) or fold mirror type optical elements. In another aspect, the optical element 102 can be suitable for use with any type of optical device, such as a laser, an electro-optical/infrared (EO/IR) device, etc.

The adjustable optical mount 101 can include a base 110 and a first rotatable frame 120a rotatably coupled (at pivot joints 121a) to the base 110 about an axis 103a. The adjustable optical mount 101 can also include a second rotatable frame 120b rotatably coupled (at pivot joints 121b) to the first rotatable frame 120a about a second axis 103b. Thus, the second rotatable frame 120b can be rotatably coupled to the base 110 about the axes 103a, 103b via rotatable couplings in the form of pivot joints 121a, 121b and the first rotatable frame 120a. The second rotatable frame 120b can interface with the optical element 102 and both the first and second rotatable frames 120a, 120b can support the optical element 102. In some examples, the first rotatable frame 120a can be associated with an elevation adjustment of the optical element 102 and the second rotatable frame 120b can be associated with an azimuth adjustment of the optical element 102.

Figure 8:
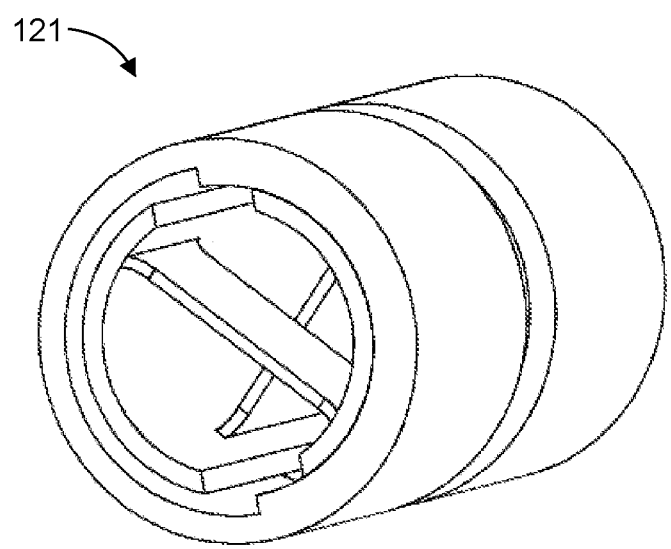
FIG. 8 illustrates a flexural pivot of the system of FIG. 1 in accordance with an example.

The pivot joints 121a, 121b can be of any suitable type or configuration known in the art for rotatably coupling the rotatable frames 120a, 120b to one another and to the base 110, such as at least one of a flexure, a bearing, or a bushing. Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns. A flexural pivot can utilize any suitable type of flexure element, such as a beam flexure, a wire flexure, etc. Flexural pivots typically provide angular motions of varying degrees depending upon their type. One exemplary type of a flexural pivot 121 that can be used in the adjustable optical mount 101 is shown in FIG. 8.

The adjustable optical mount 101 can further include a ramp 130a operably coupled to the rotatable frame 120a (indirectly as the ramp 130a is associated with the second rotatable frame 120b as shown in FIG. 1, but coupled to the first rotatable frame 120a through the pivot joints 121b), such that translational movement (e.g., in two directions 131a) of the ramp 130a relative to the rotatable frame 120a causes rotation of the rotatable frame 120a (and the rotatable frame 120b) about the axis 103a to facilitate adjustment of the optical element 102 in a rotational degree of freedom about the axis 103a. The adjustable optical mount 101 can include a linear translation actuator 140a operable to cause translational movement (e.g., in two directions 131a) of the ramp 130a relative to the rotatable frame 120a.

The adjustable optical mount 101 can also include a second ramp 130b operably coupled to the second rotatable frame 120b, such that translational movement (e.g., in two directions 131b) of the ramp 130b relative to the rotatable frame 120b causes rotation of the rotatable frame 120b about the axis 103b to facilitate adjustment of the optical element 102 in a rotational degree of freedom about the axis 103b. The adjustable optical mount 101 can include a linear translation actuator 140b operable to cause translational movement (e.g., in two directions 131b) of the ramp 130b relative to the rotatable frame 120b. Thus, as the ramps 130a, 130b move, the rotational frames 120a, 120b change angular positions, which can provide precise control of the gimbaled adjustable optical mount 101 in positioning the optical element 102.

Figure 2:
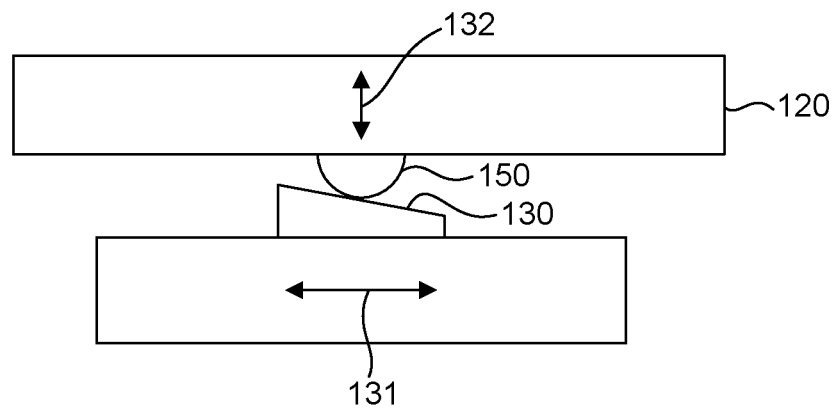
FIG. 2 is a schematic side detail view of an adjustment mechanism of the system of FIG. 1, in accordance with an example of the present disclosure.
Figure 3:
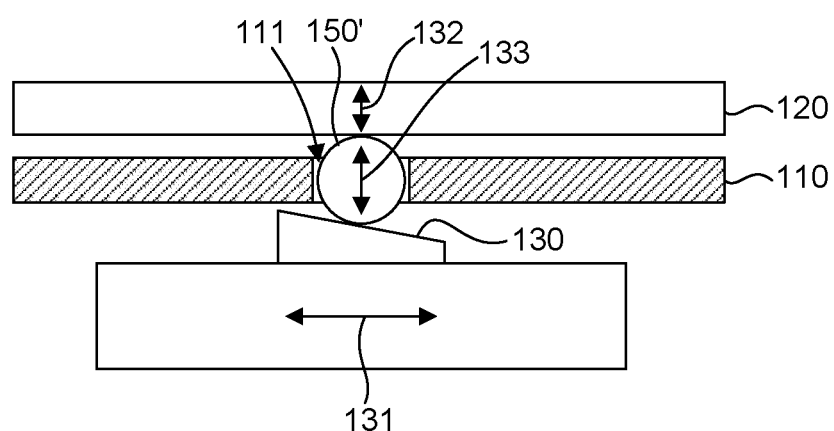
FIG. 3 is a schematic side detail view of an adjustment mechanism of the system of FIG. 1, in accordance with an example of the present disclosure.

This aspect of the present technology is further illustrated in FIGS. 2 and 3, which show a generic rotatable frame 120, ramp 130, and linear translation actuator 140. As shown in FIG. 2, the ramp 130 interfaces with a spherical element or member 150, which can be attached (e.g., affixed) to the rotatable frame 120 or integrally formed with the rotatable frame 120. The linear translation actuator 140 can cause the ramp 130 to move in directions 131 relative to the rotatable frame 120. As the ramp 130 moves in directions 131 while in contact with the spherical member 150, the rotatable frame 120 moves in directions 132. Due to a pivot joint coupling of the rotatable frame 120 (e.g., at pivot joints 121a, 121b in FIG. 1), the directions 132 can be rotational movement of the rotational frame 120 about an axis (e.g., the axis 103a, 103b in FIG. 1).

In FIG. 3, a spherical member 150' can be a separate and distinct component that interfaces with the ramp 130 and the rotatable frame 120. In this case, translational movement of the ramp 130 causes translational movement of the spherical member 150' in directions 133, which acts on the rotatable frame 120 to cause rotation of the rotatable frame 120 in the directions 132 about an axis (e.g., the axis 103a or 103b in FIG. 1). The spherical member 150' can reside at least partially in a guide opening 111 of the base 110. The guide opening 111 can be configured to constrain the spherical member 150' to provide translational movement in the directions 133. Thus, movement of the ramp 130 causes "up/down" movement of the spherical member 150' within the guide opening 111 in the directions 133, which causes the rotatable frame 120 to rotate in the directions 132 about an axis.

It should be recognized that the directions 131 of the ramp 130 can be in any suitable orientation relative to other components of the adjustable optical mount 101. In some examples, the directions 131 can be in a plane defined by rotational axes of rotatable frames (e.g., the axes 103a, 103b in FIG. 1). In a particular example, the directions 131 can be parallel to the rotational axis of the rotatable frame 120. In the example illustrated in FIG. 1, the directions 131a can be parallel to the axis 130a, and the directions 131b can be parallel to the axis 130b.

In general, and as will be recognized by those skilled in the art, the ramp 130a and a spherical member 150a of FIG. 1 can be associated with (i.e., caused to interface with) either one of the rotatable frames 120a, 120b, with the spherical member 150a being located anywhere off the axis 103a to provide a moment that would tend to cause rotation of the rotatable frame 120a about the axis 103a by action of the ramp 130a. In the example illustrated in FIG. 1, the ramp 130a and the spherical member 150a are associated with the rotatable frame 120b, but this is not intended to be limiting in any way. In this case, the spherical member 150a is located on the axis 103b so that there is no moment created by the spherical member 150a that would tend to cause or resist rotation of the rotatable frame 120b about the axis 103b (e.g., by action of the ramp 130a). Alternatively, the ramp 130a and the spherical member 150a can be associated with the rotatable frame 120a to cause rotation of the rotatable frame 120a about the axis 103a by action of the ramp 130a.

In general, the ramp 130b and a spherical member 150b of FIG. 1 can be associated with (caused to interface with) the rotatable frame 120b, with the spherical member 150b being located anywhere off the axis 103b to provide a moment that would tend to cause rotation of the rotatable frame 120b about the axis 103b by action of the ramp 130b. In the example illustrated in FIG. 1, the spherical member 150b is located on the axis 103a so that there is no moment created by the spherical member 150b that would tend to cause or resist rotation of the rotatable frame 120a about the axis 103a (e.g., by action of the ramp 130b).

In operation, or in other words as a method of positioning or adjusting an optical element associated with the adjustable optical mount 101, one or both of the ramps 130a, 130b can be actuated to move (i.e., rotate) the optical element 102 about one or both of the axes 103a, 103b. For example, the ramp 130a can be actuated to move in the direction 131a, which can act on the spherical member 150a to move the rotatable frame 120a about the axis 103a. The rotatable frames 120a, 120b are coupled to one another by the pivot joints 121b and therefore the rotatable frames 120a, 120b rotate together about the axis 103a. The optical element 102 is "carried" by the rotatable frame 120b and is therefore also rotated about the axis 103a by actuation of the ramp 130a. In the illustrated example, the ramp 130a is associated with the rotatable frame 120b. Therefore, actuation of the ramp 130a can cause rotation of the rotatable frame 120a via its coupling with the rotatable frame 120b. In other examples where the ramp 130a is associated with the rotatable frame 120a, actuation of the ramp 130a can cause rotation of the rotatable frame 120b (and the supported optical element 102) via its coupling with the rotatable frame 120a.

On the other hand, the ramp 130b can be actuated to move in the direction 131b, which can act on the spherical member 150b to rotate the rotatable frame 120b about the axis 103b. The optical element 102 is "carried" by the rotatable frame 120b and is therefore also rotated about the axis 103b by actuation of the ramp 130b. In this case, the rotatable frame 120b can move independent of the rotatable frame 120a.

In one aspect, the adjustable optical mount 101 can include one or more biasing mechanisms 160 operable to provide a biasing force on the rotatable frame 120a, 120b to maintain the rotatable frame 120a, 120b in a coupled relationship with the ramp 130a, 130b as the ramp 130a, 130b undergoes translational movement. For example, the biasing mechanism 160 can provide a biasing force to ensure that the spherical members 150a, 150b remain in contact with the ramps 130a, 130b in all operational conditions, including static and dynamic ramp 130a, 130b conditions. One or more biasing mechanisms 160 can be associated with one or both of the rotatable frames 120a, 120b. Such biasing mechanisms 160 can be located anywhere off the axis 103a, 103b to provide a moment that would tend to resist rotation of the rotatable frame 120a, 120b about the axis 103a, 103b by action of the ramp 130a, 130b. For example, a biasing mechanism 160 associated with the rotatable frame 120a or 120b can be located off the axis 103a (on or off the axis 103b) if the biasing mechanism is intended to provide resistance to rotation about the axis 103a. Similarly, a biasing mechanism 160 associated with the rotatable frame 120b can be located off the axis 103b (on or off the axis 103a) if the biasing mechanism is intended to provide resistance to rotation about the axis 103b. In the example illustrated in FIG. 1, the biasing mechanism 160 is associated with the rotatable frame 120b and is located off the axes 103a and 103b. Thus, a single biasing mechanism 160 can be utilized to resist rotation of the rotatable frames 120a, 120b about the axes 103a, 103b.

Figure 4:
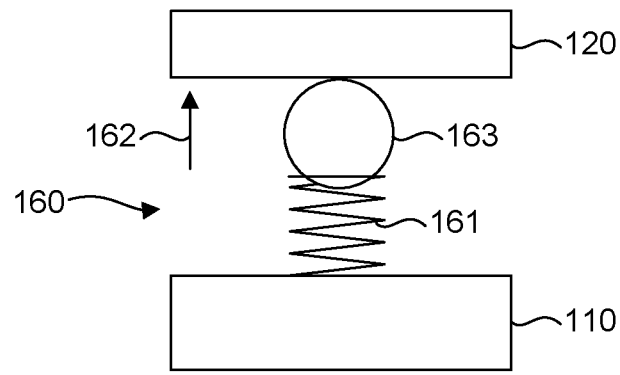
FIG. 4 is a schematic side detail view of a biasing mechanism of the system of FIG. 1, in accordance with an example of the present disclosure.

FIG. 4 is a detailed side view of the exemplary biasing mechanism 160 associated with a generic rotatable frame 120 and the base 110. In general, the biasing mechanism 160 can comprise a spring 161 operably coupled to the rotatable frame 120 and the base 110 to bias the rotatable frame 120 and the base 110 away from one another (or toward one another) in the region or space proximate or adjacent to the biasing mechanism 160. In one aspect, the spring 161 can be preloaded. In the FIG. 4 example, the spring 161 is configured to bias the rotatable frame 120 away from the base 110 in a direction 162. In this case, the spring 161 can be a compression spring. The biasing mechanism 160 can also include a spherical member 163, which can be biased by the spring 161. In the illustrated example, the spring 161 is associated with (e.g., coupled or affixed to) the base 110 and the spherical member 161 is associated with (e.g., in contact with) the rotatable frame 120, such that the spring 161 biases the spherical member 163 against the rotatable frame 120. Alternatively, the biasing mechanism 160 can be configured such that the base 110 is associated with the rotatable frame 120 and the spherical member 163 is biased by the spring 161 against the base 110. Thus, in one aspect, the spring 161 can be fixedly coupled to the rotatable frame 120 or the base 110.

Figure 5:
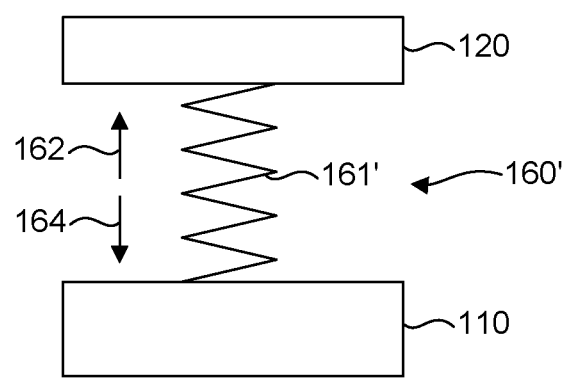
FIG. 5 is a schematic side detail view of a biasing mechanism of the system of FIG. 1, in accordance with an example of the present disclosure.

FIG. 5 is a detailed side view of another example of a biasing mechanism 160' associated with the generic rotatable frame 120 and the base 110. The biasing mechanism 160' can include a spring 161' operably coupled to the rotatable frame 120 and the base 110 to bias the rotatable frame 120 and the base 110 away from one another (or toward one another) in the region or space proximate the biasing mechanism 160'. In one aspect, the spring 161' can be preloaded. In the FIG. 5 example, the spring 161' can be configured to bias the rotatable frame 120 away from the base 110 in the direction 162. In this case, the spring 161' can be a compression spring. Alternatively, the spring 161' can be configured to bias the rotatable frame 120 toward the base 110 in a direction 164. In this case, the spring 161' can be a tension spring. A tension spring configuration can be utilized at a location where the rotatable frame 120 and the base 110 are to be pulled toward one another in order to maintain contact between the spherical members 150a, 150b and the ramps 130a, 130b, such as at 165 in FIG. 1. In the FIG. 5 example, the spring 161' is associated with the base 110 and the rotatable frame 120, such that the spring 161' can be coupled to or merely in contact with either component. Thus, in one aspect, the spring 161' can be fixedly coupled to the rotatable frame 120, the base 110, or both.

It should be recognized that any suitable biasing mechanism can be utilized in accordance with the principles disclosed herein. For example, as an alternative to those examples discussed above, a biasing mechanism can be incorporated into or with one or more pivot joints 121a, 121b, such as by incorporating a spring with the joint or preloading a flexural pivot.

In one aspect, the adjustable optical mount 101 can be a kinematic mount in that the mount 101 can support the optical element 102 in six degrees of freedom (translations along three mutually orthogonal axes, and three rotations around these axes) without over-constraining the optical element 102 (over-constraining can result in distortion and uncertain positioning of the optical element 102). For example, each ramp 130a, 130b can be associated with a point of contact for constraining the optical element 102 (e.g., via the spherical members 150a, 150b) and the biasing mechanism 160 can provide a third point of contact for constraining the optical element 102. The ramp 130a can be operable to move the rotatable frame 120a about the axis 103a, the ramp 130b can be operable to move the rotatable frame 120b about the axis 103b, and the biasing mechanism 160 can provide resistance to movement of both rotatable frames 120a, 120b about axes 103a, 103b to ensure that no looseness or "play" exists in the movement of the rotatable frames 120a, 120b about the axes 103a, 103b. In one aspect of a kinematic mount, as illustrated in FIG. 1, a center of gravity 104 of the optical element 102 can be centrally located between the contact points associated with the ramps 130a, 130b and the biasing mechanism 160.

In one aspect, illustrated in FIG. 2, the spherical member 150 can provide for a single point of contact with the rotatable frame 120. In this example, the ramp 130 can interface directly with the rotatable frame 120 (of which the spherical member 150 is an integral part or affixed thereto) to cause rotation of the rotatable frame 120 about an axis (e.g., the axis 103a or 103b). FIG. 3 illustrates another example of single point contact with the rotatable frame 120. In this example, the spherical member 150' can be a separate and distinct component that interfaces with the ramp 130 and the rotatable frame 120. In some examples, a spherical member as disclosed herein can be a ball bearing (e.g., commercially available ball bearings), which may be inexpensive, made to tight tolerances, and substantially burr-free. Interfacing or contact surfaces of the ramp 130 and rotatable frame 120 with the spherical member 150' can have any suitable configuration, such as a flat or planar configuration, to provide stable, predictable movement of the spherical member 150' along such surfaces during operation. For the same reasons, an interfacing or contact surface of the rotatable frame 120 (or the base 110) with the spherical member 163 of the biasing mechanism 160 can be similarly configured.

Referring again to FIG. 1, in some examples, the system 100 can include a sensor 170 operable to facilitate determining a position (e.g., angular position) of the optical element 102. The sensor 170 can be or include any suitable sensor type or configuration known in the art that can be used to determine a position of the optical element 102. For example, the sensor 170 can comprise at least one of a potentiometer, a position sensor, a distance sensor, an encoder, a Hall effect sensor, or an eddy current sensor. In some examples, the sensor 170 can be operable to determine a position of the optical element 102 directly (e.g., a laser beam reflecting off the optical sensor 102) and/or indirectly (e.g., via determining a position of the rotatable frame 120a, 120b, the ramp 130a, 130b, the linear translation actuator 140a, 140b, or other suitable feature or component of the adjustable optical mount 101). The sensor 170 can be operable to provide active feedback on the position of the optical element 102.

In some examples, the system 100 can include a control system 180 operably coupled to the linear translation actuators 140a, 140b and the sensor 170 to facilitate control of the linear translation actuators 140a, 140b based on the position of the optical element 102 as determined based on sensor 170 input or information. In one aspect, this configuration can enable active feedback control of the linear translation actuators 140a, 140b to ensure that the optical element 102 is correctly aligned or positioned. The control system 180 can include any suitable hardware (e.g., a processor 181 and memory 182), software, etc. typically used in control systems to enable open loop and/or closed loop control of the linear translation actuators 140a, 140b. In one aspect, "slow" misalignment effects, such as gimbal orbital error, can be calibrated out via a lookup table.

In some examples, the adjustable optical mount 101 can include anti-backlash mechanisms 190a, 190b operable to minimize backlash in movement of respective ramps 130a, 130b. Aspects of the anti-backlash mechanism are discussed in more detail below.

The linear translation actuators 140a, 140b can be or include any suitable actuator type or configuration known in the art that can be used to provide translational (e.g., linear) movement of the ramps 130a, 130b, respectively. For example, the linear translation actuators 140a, 140b can comprise at least one of a linear actuator (e.g., a linear motor), a rotary actuator, a lead screw, a ball screw, a worm and worm gear, or an electric motor (e.g., a servomotor, a stepper motor, a piezo drive, etc.).

Figure 6:
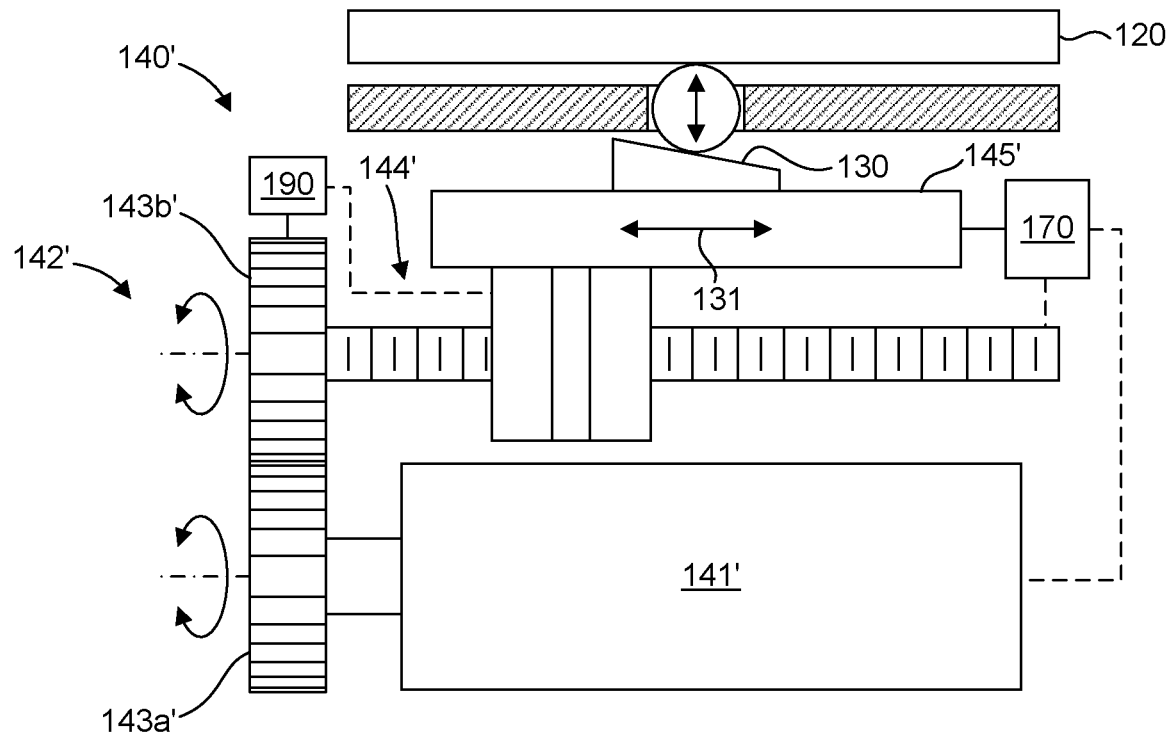
FIG. 6 is a schematic side detail view of an adjustment mechanism of the system of FIG. 1, in accordance with an example of the present disclosure.

FIG. 6 illustrates the ramp 130 and rotatable frame 120 configuration of FIG. 3, with a more particular linear translation actuator 140' configuration. In this case, the linear translation actuator 140' can include a rotary actuator 141' or other suitable rotary output device, such as a rotary electric motor. The linear translation actuator 140' can also include a drive train 142' operably coupled to the rotary actuator 141'. The drive train 142' can include gears 143a', 143b' coupled to a suitable rotational to linear motion conversion device 144' as known in the art, such as a leadscrew, a ball screw, a rack and pinion gear, etc. The linear translation actuator 140' can also include a linear slide 145' coupled to the rotational to linear motion conversion device 144'. The linear slide 145' can be constrained to move linearly in the directions 131 and can be coupled to the ramp 130. The linear slide 145' can be of any suitable design or configuration as known in the art, which may include a carriage, a rail, a track, a bearing, a bushing, etc. to provide smooth and consistent linear movement of the ramp 130 in the directions 131, depending upon the direction of rotation of the rotary actuator 141'.

In one aspect, one or more sensors 170 (e.g., an encoder, potentiometer, etc.) can be operably coupled to or otherwise associated with at least one component of the linear translation actuator 140'. In particular, one or more sensors 170 can be operably coupled to or otherwise associated with at least one of the rotary actuator 141', a component of the drive train 142' (e.g., a gear 143a', 143b', a leadscrew or ball screw 144', etc.), or the linear slide 145'. For example, one or more sensors 170 can be configured to follow the movement of a coupled or associated component (e.g., via gearing) to determine a position or change of position of the coupled or associated component, which can facilitate determining a position (e.g., angular position) of the optical element 102.

In one aspect, one or more anti-backlash mechanisms or systems 190 can be operably coupled to or otherwise associated with at least one component of the linear translation actuator 140'. In particular, one or more anti-backlash mechanisms 190 can be operably coupled to or otherwise associated with at least one of the rotary actuator 141', a component of the drive train 142' (e.g., a gear 143a', 143b', a leadscrew or ball screw 144', etc.), or the linear slide 145'. For example, one or more anti-backlash mechanisms 190 can be configured to minimize or eliminate backlash in any drive train interface (e.g., a gear or screw interface). Any suitable anti-backlash mechanism known in the art may be utilized, such as an anti-backlash ball screw, an anti-backlash lead screw, anti-backlash gears, etc. Such anti-backlash mechanisms typically utilize a biasing spring or a "back torque" applied by a motor operable to bias a gear or screw component against an interfacing gear or screw component.

Figure 7:
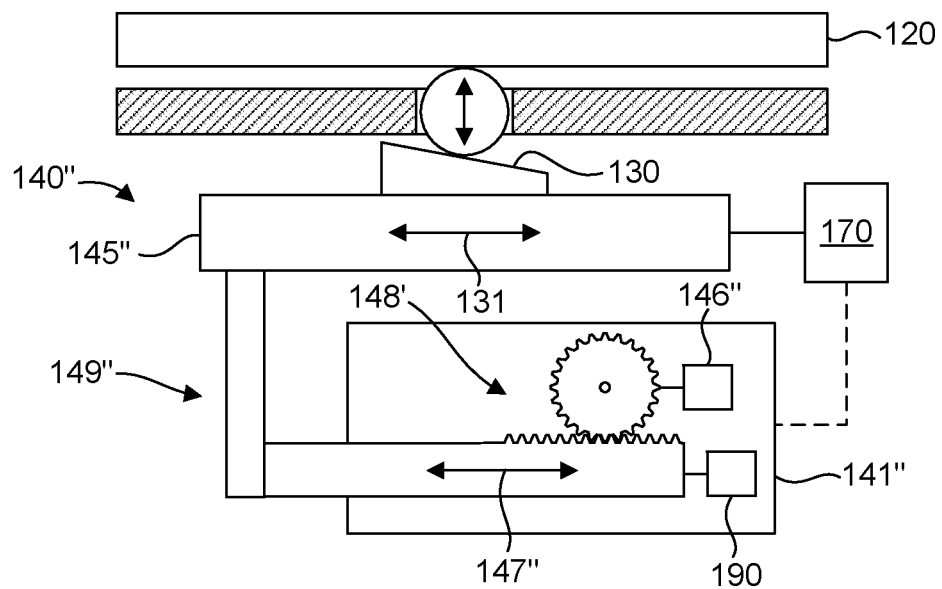
FIG. 7 is a schematic side detail view of an adjustment mechanism of the system of FIG. 1, in accordance with an example of the present disclosure.

FIG. 7 illustrates the ramp 130 and rotatable frame 120 configuration of FIG. 3, with another more particular linear translation actuator 140" configuration. In this case, the linear translation actuator 140" can include a linear actuator 141" or other suitable linear output device, such as a linear electric motor, operable to provide an output in two linear directions 147". In some examples, such as in the example illustrated in FIG. 7, the linear actuator 141" can include a rotary electric motor 146" coupled to a rack and pinion gear train 148", which can be configured to move in the linear directions 147".

The linear translation actuator 140" can also include a drive arm 149" operably coupled to linear actuator 141". The linear translation actuator 140" can also include a linear slide 145" coupled to the drive arm 149". The linear slide 145" can be constrained to move linearly in the directions 131 and can be coupled to the ramp 130. The linear slide 145" can be of any suitable design or configuration as known in the art, which may include a carriage, a rail, a track, a bearing, a bushing, etc. to provide smooth and consistent linear movement of the ramp 130 in the directions 131.

In one aspect, one or more sensors 170 (e.g., an encoder, potentiometer, etc.) can be operably coupled to or otherwise associated with at least one component of the linear translation actuator 140". In particular, one or more sensors 170 can be operably coupled to or otherwise associated with at least one of the linear actuator 141" (e.g., the rotary electric motor 146" and/or the rack and pinion gear train 148"), the drive arm 149", or the linear slide 145".

In one aspect, one or more anti-backlash mechanisms 190 can be operably coupled to or otherwise associated with at least one component of the linear translation actuator 140". In particular, one or more anti-backlash mechanisms 190 can be operably coupled to or otherwise associated with at least one of the linear actuator 141" (e.g., the rotary electric motor 146" and/or the rack and pinion gear train 148"), the drive arm 149", or the linear slide 145". For example, one or more anti-backlash mechanisms 190 can be configured to minimize or eliminate backlash in any drive train interface (e.g., an interface of the rack and pinion gear train 148").

In one aspect, the linear translation actuators 140a, 140b of FIG. 1 can maintain the respective ramps 130a, 130b in a fixed position even when the linear translation actuators 140a, 140b are not powered. For example, the linear translation actuators 140a, 140b can include components or features that prevent or resist movement when not powered. For instance, certain mechanical components, such as a lead screw, a ball screw, a worm and worm gear, etc., can have mechanical advantage and/or friction that resists or prevents movement under forces applied to the linear translation actuator 140a, 140b via one or more of the ramps 130a, 130b (e.g., from gimbaled components such as the rotatable frames 120a, 120b) under static or dynamic conditions. Thus, power is not required to maintain position of the optical element 102 and the linear translation actuators 140a, 140b can provide a failsafe in the event that power is lost. Even if the optical element 102 does shift position, this can be detected by the sensor(s) 170 and corrected by operation of the linear translation actuators 140a, 140b (e.g., as controlled by the control system 180). The technology disclosed herein can therefore provide a simple way to adjust the optical element 102 at any time (e.g., in the field) without requiring disassembly of the system 100 (e.g., breaking seals, etc.). This attribute is beneficial for many applications, such as high precision applications and cryogenic applications.

In one aspect, the adjustable optical mount 101 as disclosed herein can utilize many commercial off-the-shelf (COTS) parts (e.g., ball bearings, actuator components (e.g., motors, gears, ball screws, lead screws, linear slides, etc.), sensors, etc.), which can provide low complexity in the design of the adjustable optical mount 101 and still provide highly precise and repeatable adjustments. If improved performance is desired, more precise manufacturing techniques can be utilized (e.g., lapping interface surfaces) and/or more precise sensors can be included.

There is also provided, in some examples, various methods for facilitating the adjustment of an optical element by configuring any of the adjustable optical mounts and adjustable optical mount systems (including the optical element) described herein. In accordance with one example, a method for facilitating adjustment of an optical element is disclosed. The method can comprise rotatably coupling a frame to a base about an axis. Optionally, the method can further comprise rotatably coupling a second rotatable frame about a second axis. The first and second rotatable frames can be rotatably coupled (at pivot joints) to one another about the axes, and relative to the base. In one aspect, the second rotatable frame can be rotatably coupled to the base about the axes via the rotatable couplings (e.g., in the form of pivot joints) and the first rotatable frame. The second rotatable frame can be configured to interface with the optical element. The method can further facilitate the first rotatable frame being associated with an elevation adjustment of the optical element, and the second rotatable frame being associated with an azimuth adjustment of the optical element.

The method can also comprise facilitating support of the optical element with one or both of the first and second rotatable frames. The method can further comprise operably coupling (indirectly) a first ramp to the first rotatable frame such that translational movement of the first ramp relative to the first rotatable frame causes rotation of the first rotatable frame (and the second rotatable frame if present) about the first axis. Additionally, the method can comprise facilitating translational movement of the first ramp relative to the first rotatable frame to rotate the first rotatable frame (and the second rotatable frame if present) about the first axis and facilitate adjustment of the optical element in a first rotational degree of freedom. The method can optionally further comprise operably coupling a second ramp to the second rotatable frame such that translational movement of the second ramp relative to the second rotatable frame causes rotation of the second rotatable frame about the second axis. Additionally, the method can comprise facilitating translational movement of the second ramp relative to the second rotatable frame to rotate the second rotatable frame about the second axis and facilitate adjustment of the optical element in a second rotational degree of freedom. It is noted that no specific order is required in this method, though generally in one embodiment, these method steps can be carried out sequentially.

In one aspect of the method, facilitating movement of the ramp(s) can comprise operably coupling a linear translation actuator to the ramp (or ramps, respectively). In another aspect of the method, operably coupling the ramp(s) to the rotatable frame can comprise interfacing a spherical member with the ramp and the rotatable frame (or with the ramps and the rotatable frames, respectively), and constraining the spherical member to provide translational movement.

The method can further comprise configuring the adjustable optical mount, and particularly a linear translation actuator, with an anti-backlash mechanism as described herein for minimizing backlash in movement of an associated ramp.

The method can further comprise configuring the adjustable optical mount with a biasing mechanism operable to provide a biasing force on the rotatable frame(s) to maintain the rotatable frame(s) in a coupled relationship with the ramp as the ramp undergoes translational movement.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An adjustable optical mount, comprising:
   a base;
   a first rotatable frame rotatably coupled to the base about an axis, the first rotatable frame configured to support an optical element;
   a ramp operably coupled to the first rotatable frame such that translational movement of the ramp relative to the first rotatable frame causes rotation of the first rotatable frame about the axis to facilitate adjustment of the optical element in a rotational degree of freedom; and
   a biasing mechanism configured to provide a biasing force on the first rotatable frame to maintain the first rotatable frame in a coupled relationship with the ramp as the ramp undergoes the translational movement.

2. The adjustable optical mount of claim 1, wherein the ramp interfaces directly with the first rotatable frame to cause rotation of the first rotatable frame about the axis.

3. The adjustable optical mount of claim 1, further comprising a spherical member interfacing with the ramp and the first rotatable frame, wherein the translational movement of the ramp causes translational movement of the spherical member that acts on the first rotatable frame to cause rotation of the first rotatable frame about the axis.

4. The adjustable optical mount of claim 3, wherein the spherical member resides at least partially in an opening of the base, the opening configured to constrain the spherical member to provide the translational movement of the spherical member.

5. The adjustable optical mount of claim 1, further comprising a linear translation actuator configured to provide the translational movement of the ramp relative to the first rotatable frame.

6. The adjustable optical mount of claim 5, wherein the linear translation actuator comprises at least one of a linear actuator, a rotary actuator, a lead screw, a ball screw, or an electric motor.

7. The adjustable optical mount of claim 5, further comprising an anti-backlash mechanism configured to minimize backlash in movement of the ramp.

8. The adjustable optical mount of claim 1, further comprising a sensor configured to facilitate determining a position of the optical element.

9. The adjustable optical mount of claim 8, wherein the sensor comprises at least one of a potentiometer, a position sensor, a distance sensor, an encoder, a Hall effect sensor, or an eddy current sensor.

10. The adjustable optical mount of claim 1, wherein the biasing mechanism comprises a spring.

11. The adjustable optical mount of claim 10, wherein the biasing mechanism further comprises a spherical member biased by the spring against the first rotatable frame.

12. The adjustable optical mount of claim 10, wherein the spring is fixedly coupled to the first rotatable frame.

13. The adjustable optical mount of claim 1, wherein the first rotatable frame is rotatably coupled to the base via at least one of a flexure, a bearing, or a bushing.

14. The adjustable optical mount of claim 1, further comprising:
    a second rotatable frame rotatably coupled to the first rotatable frame about a second axis; and
    a second ramp operably coupled to the second rotatable frame such that translational movement of the second ramp relative to the second rotatable frame causes rotation of the second rotatable frame about the second axis to facilitate adjustment of the optical element in a second rotational degree of freedom.

15. The adjustable optical mount of claim 14, wherein the first rotatable frame or the second rotatable frame interfaces with the optical element.

16. The adjustable optical mount of claim 14, further comprising a spherical member interfacing with the second ramp and the second rotatable frame, wherein the translational movement of the second ramp causes translational movement of the spherical member that acts on the second rotatable frame to cause rotation of the second rotatable frame about the second axis.

17. An adjustable optical mount system, comprising:
    an optical element; and
    an adjustable optical mount supporting the optical element, the adjustable optical mount including:
    a base, a first rotatable frame rotatably coupled to the base about a first axis, the first rotatable frame in support of the optical element, a first ramp operably coupled to the first rotatable frame such that translational movement of the first ramp relative to the first rotatable frame causes rotation of the first rotatable frame about the first axis to facilitate adjustment of the optical element in a rotational degree of freedom, a second rotatable frame rotatably coupled to the first rotatable frame about a second axis, and a second ramp operably coupled to the second rotatable frame such that translational movement of the second ramp relative to the second rotatable frame causes rotation of the second rotatable frame about the second axis to facilitate adjustment of the optical element in a second rotational degree of freedom.

18. The system of claim 17, further comprising a spherical member interfacing with the first ramp and the first rotatable frame, wherein the translational movement of the first ramp causes translational movement of the spherical member that acts on the first rotatable frame to cause rotation of the first rotatable frame about the first axis.

19. The system of claim 18, wherein the spherical member resides at least partially in an opening of the base, the opening configured to constrain the spherical member to provide the translational movement of the spherical member.

20. The system of claim 17, wherein the first rotatable frame or the second rotatable frame interfaces with the optical element.

21. The system of claim 17, further comprising:
a linear translation actuator configured to provide the translational movement of the first ramp relative to the first rotatable frame;
a sensor configured to facilitate determining a position of the optical element; and
a control system operably coupled to the linear translation actuator and the sensor to facilitate control of the linear translation actuator based on the position of the optical element.

22. A method for facilitating adjustment of an optical element, comprising:
rotatably coupling a frame to a base about an axis;
supporting the optical element with the frame;
operably coupling a ramp to the frame such that translational movement of the ramp relative to the frame causes rotation of the frame about the axis, wherein operably coupling the ramp to the frame comprises interfacing a spherical member with the ramp and the frame and constraining the spherical member to provide translational movement; and
facilitating the translational movement of the ramp relative to the frame to rotate the frame about the axis and facilitate adjustment of the optical element in a rotational degree of freedom.

23. The method of claim 22, wherein facilitating the translational movement of the ramp comprises operably coupling a linear translation actuator to the ramp.

24. The method of claim 22, wherein the translational movement of the ramp causes the translational movement of the spherical member, which acts on the frame to cause rotation of the frame about the axis.

25. The system of claim 17, further comprising a biasing mechanism operable to provide a biasing force on the first rotatable frame to maintain the first rotatable frame in a coupled relationship with the first ramp as the first ramp undergoes translational movement.

26. The method of claim 22, further comprising providing a biasing force on the frame to maintain the frame in a coupled relationship with the ramp as the ramp undergoes translational movement.

* * * * *